Patented Dec. 27, 1927.

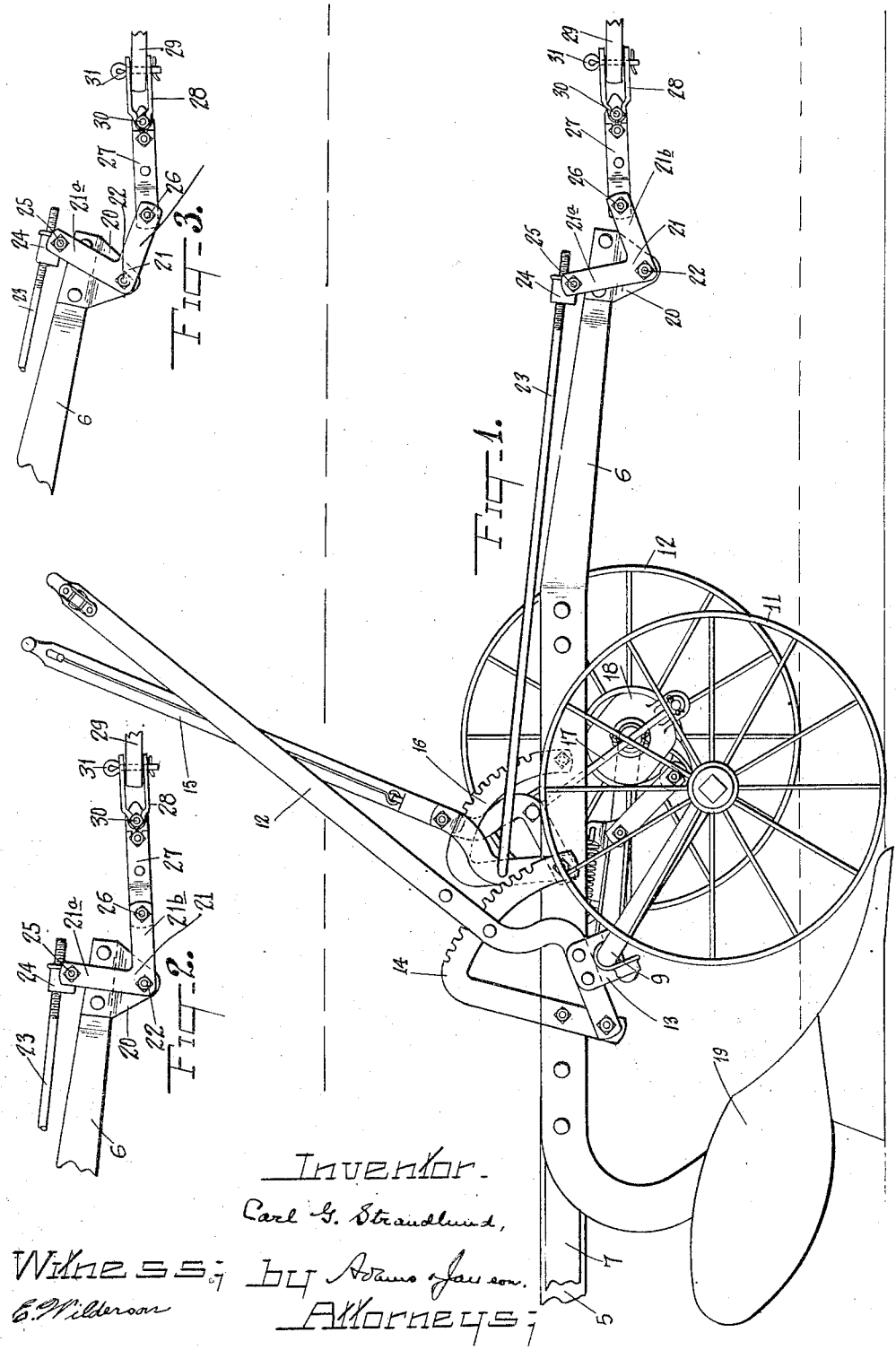

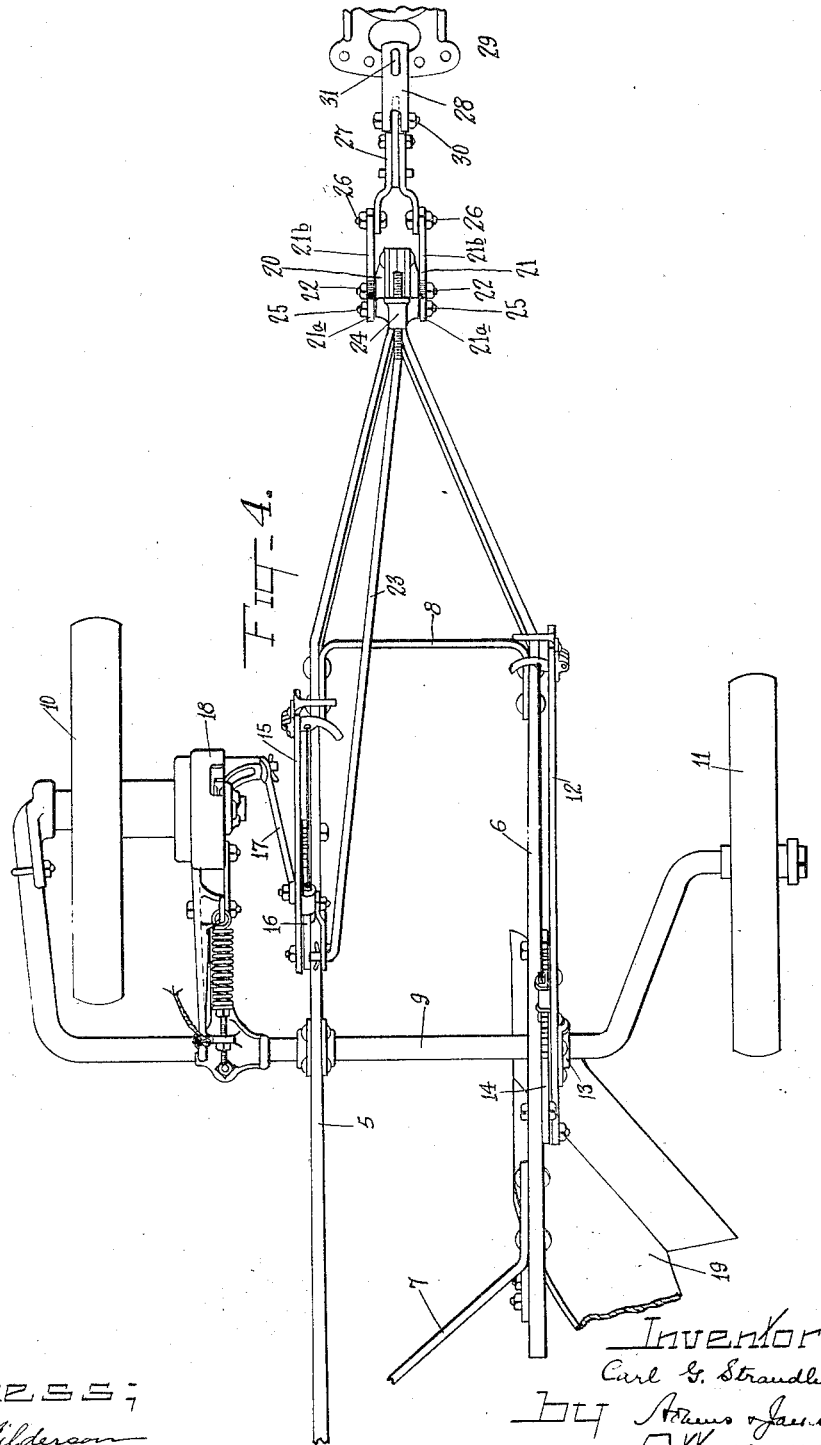

1,653,678

UNITED STATES PATENT OFFICE.

CARL G. STRANDLUND, OF MOLINE, ILLINOIS, ASSIGNOR TO DEERE & COMPANY, OF MOLINE, ILLINOIS, A CORPORATION OF ILLINOIS.

DRAFT-CONTROL MECHANISM FOR PLOWS.

Application filed February 11, 1924, Serial No. 691,934. Renewed October 13, 1927.

My invention relates to plows in which the plow body or bodies are carried on a beam or frame structure arranged to be raised or lowered by means of a swinging crank member, and it has more particularly to do with the provision of means by which the draft connections between the propelling means, such as a team or a tractor, and the plow will remain constantly substantially in the line of draft, notwithstanding vertical adjustment of the beam and plow bodies to vary the depth of plowing.

In the accompanying drawings in which I have illustrated my improvements applied to a power lift plow arranged to be drawn by a tractor and provided with a lever by the adjustment of which the plow bodies may be raised or lowered to vary the depth of plowing, of the type illustrated and described in my pending application, Serial No. 374,835, filed April 19, 1920, Figure 1 is a side elevation in which the draft devices are illustrated in the position they occupy when the furrow openers are adjusted for deep plowing.

Figure 2 is a detail illustrating the position occupied by the draft devices for operating at a normal or average plowing depth.

Figure 3 is a similar view showing the draft devices in the position they occupy for shallow plowing, and Figure 4 is a plan view, some parts being broken away.

Referring to the drawings, 5, 6 indicate two plow beams suitably connected by braces 7, 8 to form a unitary structure in the form of a frame, the forward ends of the beams being arranged to converge and being secured together, as best shown in Figure 4. The frame structure is mounted on a transverse crank axle 9, the end portion of which at the landward side of the plow is turned inwardly to form a spindle on which is mounted a land wheel 10; the opposite end of said axle is bent outwardly and on it is mounted a furrow wheel 11. Fulcrumed on the furrowward side of the frame of the plow is a leveling lever 12 operatively connected with the axle 9 by a yoke 13 in such manner that by rocking said lever, the furrow openers may be leveled. Associated with said lever is a sector 14 by which it may be locked in its different positions of adjustment. The construction and operation of these parts has nothing to do with my present invention, and a detailed description thereof is, therefore, believed to be unnecessary. They are fully shown and described in my pending application, Serial No. 248,993, filed August 8, 1918.

Also mounted on the frame is a depth adjusting lever 15 with which is associated a sector 16 by which it may be locked in its different positions of adjustment. Said lever is operatively connected by link 17 with suitable clutch mechanism, indicated generally by reference numeral 18, associated with the land wheel 10, and arranged so that by operating said lever the beam structure may be raised or lowered to vary the operating depth of the furrow openers. When the clutch mechanism is thrown into operation by the operator on the tractor, the rotation of the land wheel causes the axle 9 to rock to lift the plows out of operative position or to permit them to descend into operative position, depending on their position when the clutch mechanism is thrown into operation. This construction also is fully disclosed in my application hereinbefore referred to carried by the beams are furrow openers 19.

At the forward end of the beam structure is rigidly secured a bracket 20 upon which is fulcrumed a three armed or bell crank lever 21 by means of a bolt 22, said lever being preferably made up of two duplicate parts, one at each side of the bracket 20, as best shown in Figure 4. The fulcrum 22 is placed at the angle of the lever 21 and from said fulcrum one arm 21$^a$ of said lever extends upward and is connected with the lever 15 by a connecting rod 23, the rear end of which is preferably in the form of a hook adapted to engage a hole in the lower portion of said lever, as shown in Figure 4. The forward end of said link is screw threaded and passes through a threaded sleeve 24, pivotally connected with the arm 21$^a$ by a bolt 25. By this construction the effective length of the connection between the lever 15 and the bell crank lever 21 may be conveniently adjusted. The other arm 21$^b$ of the lever 21 extends forward from the pivot or fulcrum 22 of said lever and is connected by a pivot bolt 26 with the rear end of a draft coupling 27 preferably in the form of a bifurcated link, as shown in Figure 4. The forward end of said link is connected by a shackle or clevis 28 with a draft member 29, which may be the draw bar of a tractor or double tree. A horizontal pivot 30 connects the forward end of the draft coupling 27 with the shackle 28 so that said draft coupling may swing vertically, and the shackle 28 is connected with the draft member 29 by a vertical pivot 31 so that it may swing laterally.

The parts are so designed that when the plow bodies are set for plowing at the average or normal depth the forwardly extending arm 21$^b$ of the bell crank 21 will be in substantial alignment with the draft coupling 27, which lies in the line of draft, and the arm 21$^a$ of said bell crank lever will be substantially upright. It will be evident, therefore, that if the plow bodies be set to operate at a point either above or below such average depth, the arm 21$^b$ will be turned to an angular position with reference to said draft coupling, imposing either a tension strain or a compression strain on the rod 23, depending upon the direction in which the depth of plowing is varied. In Figure 1 the plow bodies are shown as being adjusted to plow at their greatest depth, at which time the arm 21$^a$ of the bell crank lever extends rearward and the arm 21$^b$ thereof extends forward and upward at an angle to the draft coupling 27. The force of the draft, therefore, tends to swing the arm 21$^b$ down to the position shown in Figure 2 and, consequently, exerts a tension strain on the rod 23. If, however, the lever 15 be moved forward far enough to raise the plow bodies so that they operate at a depth shallower than the normal, the bell crank 21 would be rocked toward the position shown in Figure 3 so that arm 21$^a$ would be inclined forward and the arm 21$^b$ would be inclined downward at an angle to the draft coupling 27. The force of the draft then tends to rock the bell crank lever in the opposite direction, and applies a compression strain to the rod 23. In connection with the rocking movements of the bell crank lever 21, above described, the fulcrum 22 of said lever moves vertically across the line of draft as the forward end of the beam structure is raised or lowered in connection with the variation made in the depth of plowing. As shown in Figure 2 when plowing at the normal depth, the fulcrum lies substantially in the line of draft so that then there is no appreciable strain on the connecting rod.

From the foregoing description, it will be seen that notwithstanding the vertical adjustment of the plow bodies to vary the depth of plowing, the draft coupling 27 will always remain substantially in the line of draft while the beam will be permitted to rise or fall as required in connection with such adjustment. By arranging the draft connections as described so that the fulcrum of the lever 21 moves across the line of draft in going from the deep plowing adjustment to the shallow adjustment, the strain upon the depth adjusting lever is much less than it would otherwise be and, therefore, such lever may be adjusted much easier.

It should be understood that the term "bell crank levers" as herein used is not employed in a restricted sense but is intended to comprehend any equivalent device.

What I claim is:

1. In a plow the combination with a beam, a furrow opener carried thereby, means supporting the beam and adapted to be rocked to raise or lower the same, and means for adjusting said supporting means to move the beam vertically to vary the depth of plowing, of a bell crank lever fulcrumed on the front end portion of the beam to rock in a longitudinal vertical plane, means connecting one of the arms of said lever with said adjusting means, and a draft coupling pivotally connected with another arm of said lever and adapted to be connected with a propelling member, the pivot of the latter arm and the fulcrum of said lever being arranged to be substantially in longitudinal alinement with said draft coupling for plowing at normal depth, whereby said fulcrum will be caused to move vertically across the line of draft by vertical movement of the beam to vary the depth of plowing.

2. In a plow the combination with a beam, a furrow opener carried thereby means supporting the beam and adapted to be rocked to raise or lower the same, and means for adjusting said supporting means to move the beam vertically to vary the depth of plowing, of a coupling adapted to be pivotally connected with a draft member to extend rearwardly therefrom, a bell crank lever fulcrumed intermediately on the front portion of the beam to swing in a vertical plane, said lever having a forwardly extending arm pivotally connected with said coupling and arranged to transmit the draft to the beam, and a longitudinally adjustable connection between said depth adjusting means and said lever.

3. In a plow the combination with a beam, a furrow opener carried thereby, means supporting the beam and adapted to be rocked to raise or lower the same, and means for adjusting said supporting means to move the beam vertically to vary the depth of plowing, of a vertically and laterally swinging coupling adapted to be pivotally connected with a drag member to extend rearwardly therefrom, a bell crank lever fulcrumed intermediately on the front portion of the beam to swing in a vertical plane, said lever having a forwardly extending arm pivotally connected with said coupling and arranged to transmit the draft to the beam, the pivot of said arm and the fulcrum of said lever being arranged to be substantially in longitudinal alinement with said draft coupling for plowing at normal depth, whereby said fulcrum will be caused to move vertically across the line of draft by vertical movement of the beam to vary the depth of plowing and means connected with the other arm of said lever and actuated by the operation of said depth adjusting means to rock said lever to move the fulcrum thereof vertically relatively to the line of draft, said means being arranged to hold said lever against rocking by tension or by compression, depending on whether the furrow opener is adjusted to work at one side or the other of a predetermined or normal plowing depth.

4. In a plow the combination with a beam, a furrow opener carried thereby, means supporting the beam and adapted to be rocked to raise or lower the same, and means for adjusting said supporting means to move the beam vertically to vary the depth of plowing, of a coupling adapted to be pivotally connected with a draft member to extend rearwardly therefrom, a bell crank lever fulcrumed intermediately on the front portion of the beam to swing in a vertical plane, said lever having a forwardly extending arm pivotally connected with said coupling and arranged to transmit the draft to the beam, the pivot of said arm and the fulcrum of said lever being arranged to be substantially in longitudinal alinement with said draft coupling for plowing at normal depth, whereby said fulcrum will be caused to move vertically across the line of draft by vertical movement of the beam to vary the depth of plowing, and means connected with the other arm of said lever and actuated by the operation of said depth adjusting means to rock said lever, said means being arranged to hold said lever to move the fulcrum thereof vertically relatively to the line of draft against rocking by tension when the furrow opener is adjusted for deep plowing and by compression when the furrow opener is adjusted for shallow plowing.

5. In a plow the combination of a beam, a furrow opener carried thereby, means supporting the beam and adapted to rock to raise or lower the same, and means for adjusting said supporting means to move the beam vertically to vary the depth of plowing, of a coupling adapted to be pivotally connected with a draft member to extend rearwardly therefrom, a bell crank lever fulcrumed intermediately on the forward portion of the beam and having a forwardly extending arm pivotally connected with said coupling and arranged to align therewith substantially when the furrow opener is adjusted to plow at a normal depth, said lever having an upwardly extending arm and a connecting rod connected with the latter arm and with said adjusting means.

6. In a plow the combination of a beam, a furrow opener carried thereby, means supporting the beam and adapted to rock to raise or lower the same, and means for adjusting said supporting means to move the beam vertically to vary the depth of plowing, of a coupling adapted to be pivotally connected with a draft member to extend rearwardly therefrom, a bell crank lever fulcrumed intermediately on the forward portion of the beam and having a forwardly extending arm pivotally connected with said coupling and arranged to aline therewith substantially when the furrow opener is adjusted to plow at a normal depth, said lever having an upwardly extending arm, a connecting rod connected with the latter arm and with said adjusting means, and means for adjusting the effective length of said rod.

7. In a plow, the combination with a beam, a furrow opener carried thereby, a crank axle supporting the beam, and means for rocking said axle to move the beam vertically, of a bell-crank lever fulcrumed on the beam to rock in a longitudinal vertical plane, means connecting one of the arms of said lever with said axle rocking means, and a draft coupling pivotally connected with the other arm of said lever, the pivot of the latter arm and the fulcrum of said lever lying substantially in longitudinal alinement with said draft coupling when plowing at normal depth.

8. In a plow, the combination with a beam, a furrow opener carried thereby, a crank axle supporting the beam, and a lever operable to adjust said axle to move the beam vertically, of a bell-crank lever fulcrumed on the front end portion of the beam to rock in a longitudinal vertical plane, means connecting one of the arms of said bell-crank lever with said first-mentioned lever, and a draft coupling pivotally connected with the other arm of said bell-crank lever, the pivot of the latter arm and the fulcrum of said bell-crank lever lying substantially in alinement with said draft coupling when plowing at normal depth.

CARL G. STRANDLUND.